Jan. 3, 1956
R. V. RUCKER
2,729,261
RADIAL TENSIONING DEVICE
Filed Sept. 30, 1952
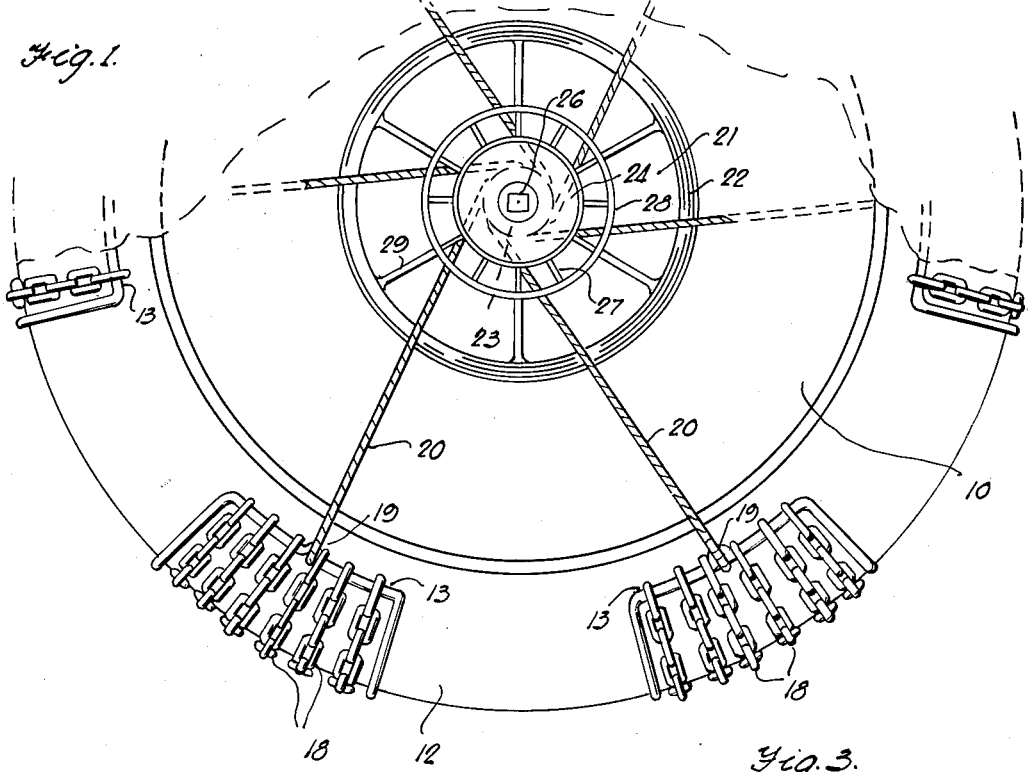
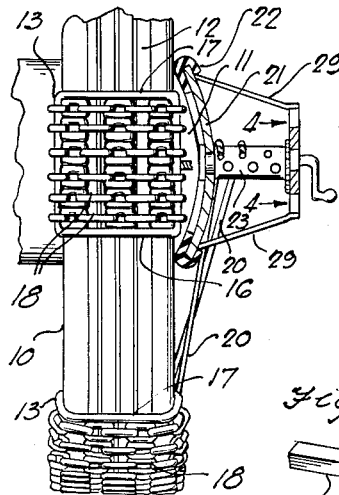
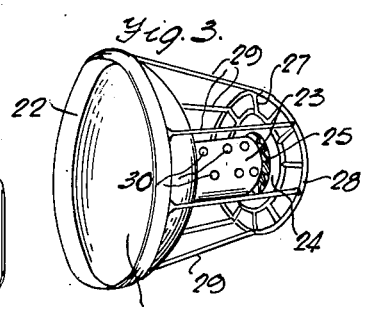
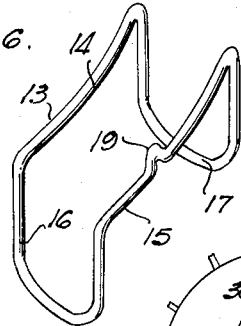
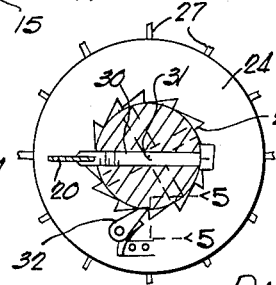
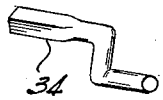
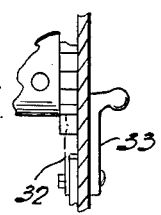
INVENTOR
RALPH V. RUCKER
BY *Irving A. McCathran*
HIS ATTORNEY

United States Patent Office

2,729,261
Patented Jan. 3, 1956

2,729,261
RADIAL TENSIONING DEVICE

Ralph V. Rucker, Charleston, W. Va., assignor of one-fourth to Arch E. Strickland, one-fourth to Geo. D. Rucker, both of Clendenin, and one-fourth to Mark C. Strickland, Elkview, W. Va.

Application September 30, 1952, Serial No. 312,213

1 Claim. (Cl. 152—218)

This invention relates to a tire chain and a ratchet type attaching means therefor, and has for one of its objects the production of a simple and efficient tire chain which may be quickly attached to a tire without the necessity of jacking up the supporting wheel of the tire.

Another object of this invention is the production of an efficient ratchet type attaching means for securing a tire chain to a tire.

Other objects and advantages of this invention will appear throughout the following specification and claim.

In the drawing:

Figure 1 is a fragmentary side elevational view of a wheel and tire showing tire chain elements secured to a tire and the attaching means secured to a wheel;

Figure 2 is a fragmentary front elevational view thereof on a reduced scale, certain parts being shown in section;

Figure 3 is a perspective view of the hub cap engaging drum element;

Figure 4 is an enlarged transverse sectional view taken on line 4—4 of Figure 2;

Figure 5 is an enlarged fragmentary sectional view taken on line 5—5 of Figure 4, certain parts being shown in section;

Figure 6 is a detail perspective view of one of the chain carrying frames;

Figure 7 is a perspective view of the drum actuating crank.

By referring to the drawing, in detail, it will be seen that 10 designates a vehicle wheel which carries a conventional hub cap plate 11. A conventional tire 12 is carried by the wheel 10. A plurality of chain carrying frames 13 are adapted to be fitted around the tread of the tire 12 in the manner shown in Figure 1, so as to attach the frames 13 to the tread of the tire 12 without the necessity of jacking up the wheel 10.

Each chain carrying frame 13 comprises a pair of substantially parallel side bars 14 and 15, as shown in detail in Figure 6. These side bars 14 and 15 terminate in substantially right-angularly extending tire embracing loops 16 and 17 at the opposite ends thereof. Tire embracing chain sections 18 are fixed to the side bars 14 and 15 to snugly fit around the outer area of the tire and transversely of the tread thereof, as shown in Figures 1 and 2. These tire sections 18 are arranged in relatively close parallel relation around the tread area of the tire between the end loops 16 and 17 of the frame 13, to provide an efficient non-skid traction shoe element. The outer bar 15 is provided with an outwardly bent portion to provide an anchoring cable receiving socket 19 to which a flexible anchoring cable 20 is adapted to be attached. The cable 20 is preferably of the flexible wire or metal type. The cables when attached converge toward the center of the wheel 10 and are outwardly inclined from the non-skid shoe elements toward the center of the wheel 10 to force the cup 21 tightly against the hub cap plate 11 as the cables 20 are wound upon the drum 23, as shown in Figure 1. Each shoe element is similarly constructed.

The hub cap engaging drum element, comprises a concavo-convex cap engaging cup 21 which is provided with a suitable rubber or other protector rim 22 for engaging the outer face of the hub cap 11 without injury thereto. This cup acts as a suction cup to assist in holding the cup upon the hub cap 11. The cup 21 carries an outstanding drum 23 which is journalled at its inner end centrally of the cup and extends in line with the axis of the cup outwardly beyond the hub cap plate 11 and cup 21, as shown in the drawing. The outer end of the drum 23 is journalled in the end plate 24 and carries a ratchet 25 and a crank receiving socket 26 at its outer end, the ratchet 25 fitting against the inner face of the plate 24 and the socket 26 being accessible from the outside of the plate 24. The plate 24 is provided with a pluraltiy of radiating spokes 27 which support a ring 28 in spaced encircling relation to the rim of the plate 24. Bracing rods 29 connect the ring 28 to the cup 21. These rods are secured at their inner ends to the cup 21 near the rim 22 and at their outer ends to the ring 28, as shown in Figure 3.

The drum 23 is provided with a plurality of spaced radially extending apertures 30 through which extend anchoring bolts 31 to secure the inner ends of the cables 20 to the drum 23 in the manner shown in Figure 4. One anchoring bolt 31 is used for each cable 20. The ratchet 25 is engaged by a spring-pressed pawl 32 to facilitate the rotation of the drum 23 in one direction while winding the cables 20 thereon, and a lever 33 is connected to the pawl 32 to release the same from the ratchet when unwinding the cables 20 from the drum 23 to remove the chain carrying shoes from the tire. A detachable crank 34 is adapted to fit into the socket 26 for rotating the drum 23 in one direction to tighten the flexible cables 20 and anchor the chain carrying frames 13 upon the tire, and to rotate the drum 23 in an opposite direction to release the cables and frames.

It should be understood that the frames 13 are placed upon the tire in the position shown in Figure 1. The cup 21 is placed firmly against the hub cap plate 11. The crank 34 is placed in the socket 26 and the spring-pressed pawl 32 automatically engages the ratchet 25. The crank is turned to wind the cables upon the drum 23 until the frames 13 are firmly fitted against the tread area of the tire 12. The cables 20 need only engage the frames 13 along their outer sides, as shown, since the frames and chains carried thereby encase and snugly fit around the tread area of the tire 12 to prevent accidental removal. This is true since the frames 13 and chain sections constitute substantially U-shaped non-skid elements, conforming to the shape of the tread area of a tire, which will resist lateral displacement. The hub cap engaging and drum element firmly engages the hub cap plate and is braced thereagainst when the cables are tightened to thereby hold the entire assembly in place. Simply by turning the lever 33 to release the pawl 32 from the ratchet 25 the cables 20 may be unwound from the drum 23 and the chain carrying frames 13 may be removed from the tire.

It should be understood that certain detail changes in the mechanical construction and arrangement of parts may be employed without departing from the spirit of the invention so long as such changes fall within the scope of the appended claim.

Having described the invention, what is claimed as new is:

A tension device for tire non-skid elements comprising a hub cap plate engaging means constituting a dished cup adapted to detachably engage the hub cap plate of a vehicle wheel, a resilient rim carried by said cup defining a cushion suction grip therefor and shielding said hub cap plate against injury from said cup, a drum journaled upon said cup and extending in line with the axis thereof and beyond said dished cup, flexible means connected to said drum and adapted to engage non-skid elements carried by a tire, said flexible means being adapted to be wound upon said drum, said flexible means being inclined outwardly from the non-skid elements and toward said drum to force said cup tightly against the hub cap as the flexible means is wound upon said drum, an end plate upon which the outer end of said drum is journaled, a plurality of bracing rods connected to said plate and to said cup for bracing said plate, and an actuating crank carried by said drum.

References Cited in the file of this patent

UNITED STATES PATENTS

| | | |
|---|---|---|
| 2,273,753 | Gelinas | Feb. 17, 1942 |
| 2,440,632 | Hack | Apr. 27, 1948 |
| 2,529,427 | Snedeker | Nov. 7, 1950 |
| 2,598,298 | Pindjak | May 27, 1952 |